US009560249B2

(12) United States Patent
Imai

(10) Patent No.: US 9,560,249 B2
(45) Date of Patent: Jan. 31, 2017

(54) IMAGING APPARATUS HAVING BENDING OPTICAL ELEMENT

(71) Applicant: HOYA CORPORATION, Tokyo (JP)

(72) Inventor: Tomonori Imai, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/879,473

(22) Filed: Oct. 9, 2015

(65) Prior Publication Data

US 2016/0112610 A1   Apr. 21, 2016

(30) Foreign Application Priority Data

Oct. 20, 2014   (JP) ................................ 2014-213550

(51) Int. Cl.
*H04N 5/225* (2006.01)
*G02B 13/00* (2006.01)
*G02B 7/00* (2006.01)

(52) U.S. Cl.
CPC ........ *H04N 5/2254* (2013.01); *G02B 13/0065* (2013.01); *G02B 7/004* (2013.01)

(58) Field of Classification Search
CPC .... G02B 13/0065; G02B 7/004; H04N 5/2254
See application file for complete search history.

(56) References Cited

U.S. PATENT DOCUMENTS

| 4,777,506 A * | 10/1988 | Hiramatsu | G03B 7/09972 |
| | | | 250/201.4 |
| 8,395,854 B2 | 3/2013 | Takakubo et al. | |
| 8,570,668 B2 | 10/2013 | Takakubo et al. | |
| 2003/0103277 A1* | 6/2003 | Mohwinkel | G02B 27/40 |
| | | | 359/811 |
| 2007/0107343 A1* | 5/2007 | Nomura | G02B 7/102 |
| | | | 52/381 |
| 2012/0075727 A1 | 3/2012 | Takakubo et al. | |
| 2015/0022718 A1* | 1/2015 | Kano | H04N 5/2254 |
| | | | 348/373 |

FOREIGN PATENT DOCUMENTS

| JP | 2006-267391 | 10/2006 |
| JP | 2006-293187 | 10/2006 |
| JP | 2010-243763 | 10/2010 |
| JP | 2013-105049 | 5/2013 |

\* cited by examiner

*Primary Examiner* — Amy Hsu
(74) *Attorney, Agent, or Firm* — Greenblum & Bernstein, P.L.C.

(57) ABSTRACT

A bending imaging apparatus provided with an imaging optical system, a bending optical element, an image sensor positioned on a post-bending optical axis of the bending optical element, and a housing, includes an inclination adjusting body having a mounting plate portion, onto which the image sensor is mounted, and an inclination-adjusting bent plate portion extending toward an underside of the bending optical element from the mounting plate portion; a swing pivot portion formed between the inclination-adjusting bent plate portion and the housing to pivotally support the inclination adjusting body; and an inclination adjusting portion positioned between the inclination-adjusting bent plate portion and the housing to overlap the bending optical element with respect to the post-bending optical axis direction and swings the inclination adjusting body about the swing pivot portion to adjust an inclination of the inclination adjusting body.

5 Claims, 12 Drawing Sheets

Fig. 13A
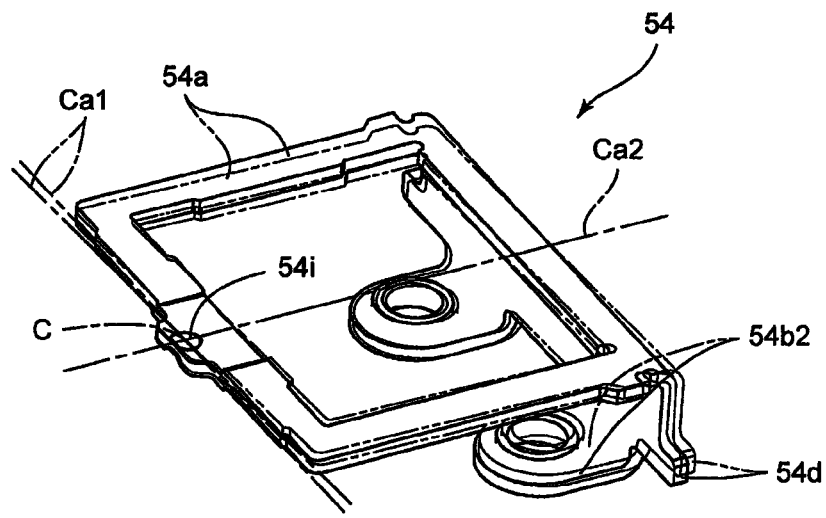
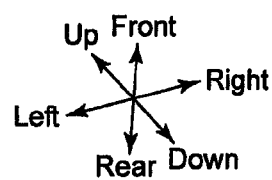
Fig. 13B
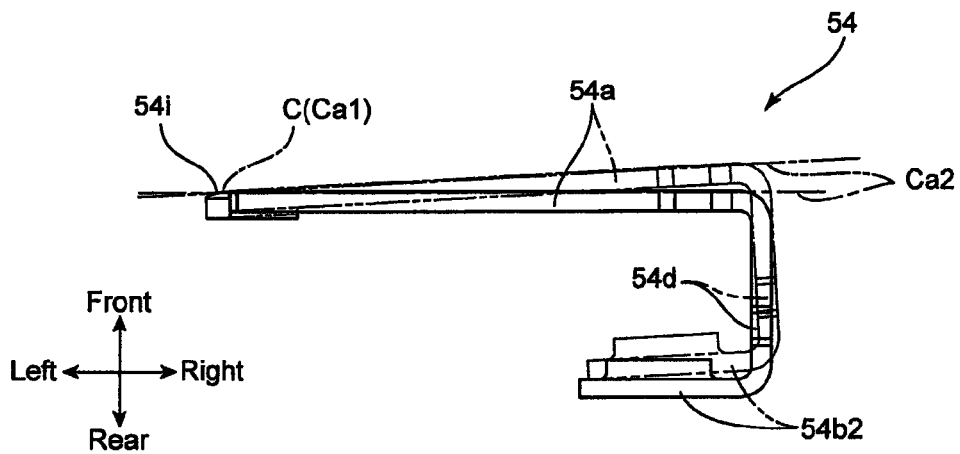

IMAGING APPARATUS HAVING BENDING OPTICAL ELEMENT

BACKGROUND OF THE INVENTION

1. Field of the Invention

The present invention relates to an imaging apparatus having at least one bending optical element, and in particular relates to such a type of imaging apparatus which is small in size and equipped with a mechanism for adjusting the inclination of an image sensor.

2. Description of the Related Art

In recent years, mobile electronic devices which are designed mainly for taking still/moving photographic images, such as digital cameras (still-video cameras) and digital camcorders (video cameras), and other mobile electronic devices which are designed to be capable of taking such photographic images as a subsidiary function, such as mobile phones equipped with a camera and smart devices (e.g., smart phones and tablet computers), etc., equipped with a camera, have become widespread, and there has been a demand to miniaturize the imaging unit incorporated in these types of mobile electronic devices. In order to miniaturize an imaging unit, an imaging optical system which is configured from a bending optical system that reflects (bends) an object light bundle using a reflection surface of a reflecting element (bending optical element) such as a prism or a mirror is known in the art. An imaging optical system having at least one bending optical element (hereinafter also referred to as the "bending imaging apparatus") is advantageous in achieving a reduction in thickness of the imaging unit in the travelling direction of the incident light emanating from an object to be photographed (Japanese Unexamined Patent Publication Nos. 2006-267391, 2010-243763 and 2013-105049).

In such a bending imaging apparatus, an image sensor is arranged on the post-bending optical axis of a bending optical element. The image sensor is usually fixed to an image sensor board provided as a separate member from the image sensor, and the image sensor board is fixed to a housing which supports an imaging optical system (a lens group(s) and a prism(s)). Although a mechanism for adjusting the inclination of an image sensor relative to a plane orthogonal to an optical axis is known in the art, e.g., Japanese Unexamined Patent Publication No. 2006-293187, it is difficult to apply this mechanism to a bending imaging apparatus; if this mechanism is applied to a bending imaging apparatus, the bending imaging apparatus increases in size.

SUMMARY OF THE INVENTION

The present invention provides a bending imaging apparatus capable of adjusting the inclination of an image sensor positioned on the post-bending optical axis (which is achieved via a bending optical element) relative to a plane orthogonal to the post-bending optical axis. In addition, the present invention provides a bending imaging apparatus capable of maintaining a small (miniaturized) size, especially in the lateral (horizontal) length (the length in the direction of the pre-bending optical axis of a bending optical element) while being equipped with a mechanism for adjusting the inclination of an image sensor; the length of the imaging optical system in the optical axis direction thereof (pre-bending optical axis direction/movable lens group optical axis direction), the length of the imaging optical system in the post-bending optical axis direction, and the length of the imaging optical system in a direction orthogonal to both the optical axis direction of the imaging optical system and the post-bending optical axis direction are defined as the lateral length, the thickness and the width, respectively.

According to an aspect of the present invention, a bending imaging apparatus is provided, having an imaging optical system, a bending optical element which bends an object light bundle that emanates from the imaging optical system, an image sensor which is rectangular in a front view and positioned on a post-bending optical axis of the bending optical element, and a housing which supports the imaging optical system, the bending optical element and the image sensor, wherein the bending imaging apparatus includes an inclination adjusting body which includes a mounting plate portion, onto which the image sensor is fixedly mounted, and an inclination-adjusting bent plate portion which extends toward an underside of the bending optical element from the mounting plate portion; a swing pivot portion which is formed between the inclination-adjusting bent plate portion of the inclination adjusting body and the housing to pivotally support the inclination adjusting body; and an inclination adjusting portion which is positioned between the inclination-adjusting bent plate portion of the inclination adjusting body and the housing so as to overlap the bending optical element as viewed along said post-bending optical axis, wherein the inclination adjusting portion swings the inclination adjusting body about the swing pivot portion to adjust an inclination of the inclination adjusting body.

It is desirable for the inclination adjusting body to include a biaser positioned between the inclination-adjusting bent plate portion of the inclination adjusting body and the housing to bias the mounting plate portion of the inclination adjusting body in a direction away from the housing; and a pair of adjustment screw members which fixedly engage the inclination-adjusting bent plate portion of the inclination adjusting body with the housing against a biasing force of the biaser.

It is desirable for the inclination-adjusting bent plate portion of the inclination adjusting body to include a flat plate portion which bends toward the bending optical element from the mounting plate portion; and a pair of screw-engagement portions which extend toward the underside of the bending optical element from the flat plate portion. The pair of adjustment screw members are screw-engaged with the pair of screw-engagement portions.

It is desirable for axes of the pair of adjustment screw members to be positioned inside a planar outline of the image sensor with respect to a direction of the post-bending optical axis.

It is desirable for the swing pivot portion to include a swing pivot protrusion which is formed on an inner side marginal portion of the mounting plate portion at a central position on the inner side marginal portion to protrude in a direction away from the bending optical element, the inner side marginal portion being positioned on an opposite side of the mounting plate portion from the inclination-adjusting bent plate portion side; and a contact portion which is formed on the housing and is in contact with the swing pivot protrusion.

According to the present invention, a bending imaging apparatus which is equipped with a mechanism for adjusting the inclination of an image sensor can be achieved with no increase in the length of the bending imaging apparatus in the direction of the pre-bending optical axis of (a bending optical element contained in) the bending imaging apparatus.

The present disclosure relates to subject matter contained in Japanese Patent Application No. 2014-213550 (filed on Oct. 20, 2014) which is expressly incorporated herein by reference in its entirety.

BRIEF DESCRIPTION OF THE DRAWINGS

The present invention will be described below in detail with reference to the accompanying drawings in which:

FIG. 13A is a perspective view of the inclination adjusting body of the image sensor inclination adjusting mechanism, showing a state where the inclination of the image sensor is adjusted by tilting (rotating) the inclination adjusting body about different axes; and FIG. 13B is a bottom view of the inclination adjusting body of the image sensor inclination adjusting mechanism, showing the same state.

DESCRIPTION OF THE PREFERRED EMBODIMENT

Figure 1:
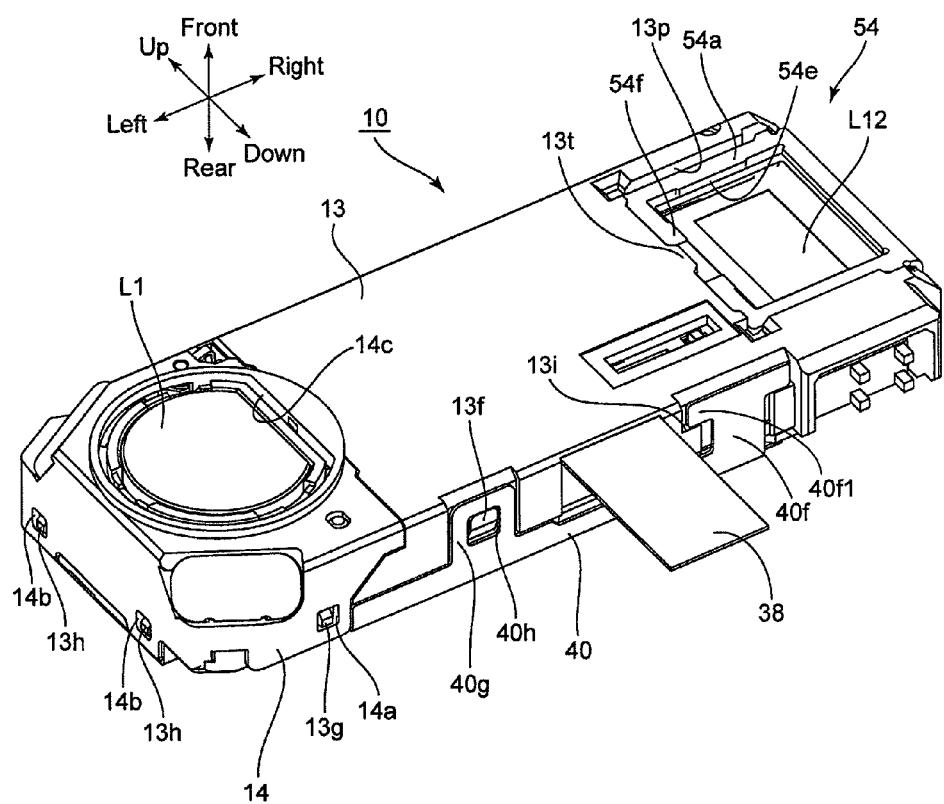
FIG. 1 is a perspective view of an embodiment of a bending imaging apparatus according to the present invention, showing the outward appearance thereof.

An embodiment of a bending imaging apparatus (bending imaging unit) 10 according to the present invention will be discussed below with reference to FIGS. 1 through 13. In the following descriptions, forward and rearward directions, leftward and rightward directions, and upward and downward directions are determined with reference to the directions of the double-headed arrows shown in the drawings. The present embodiment of the bending imaging apparatus 10 can be incorporated in a portable device such as a mobile terminal or a tablet computer.

Figure 5:
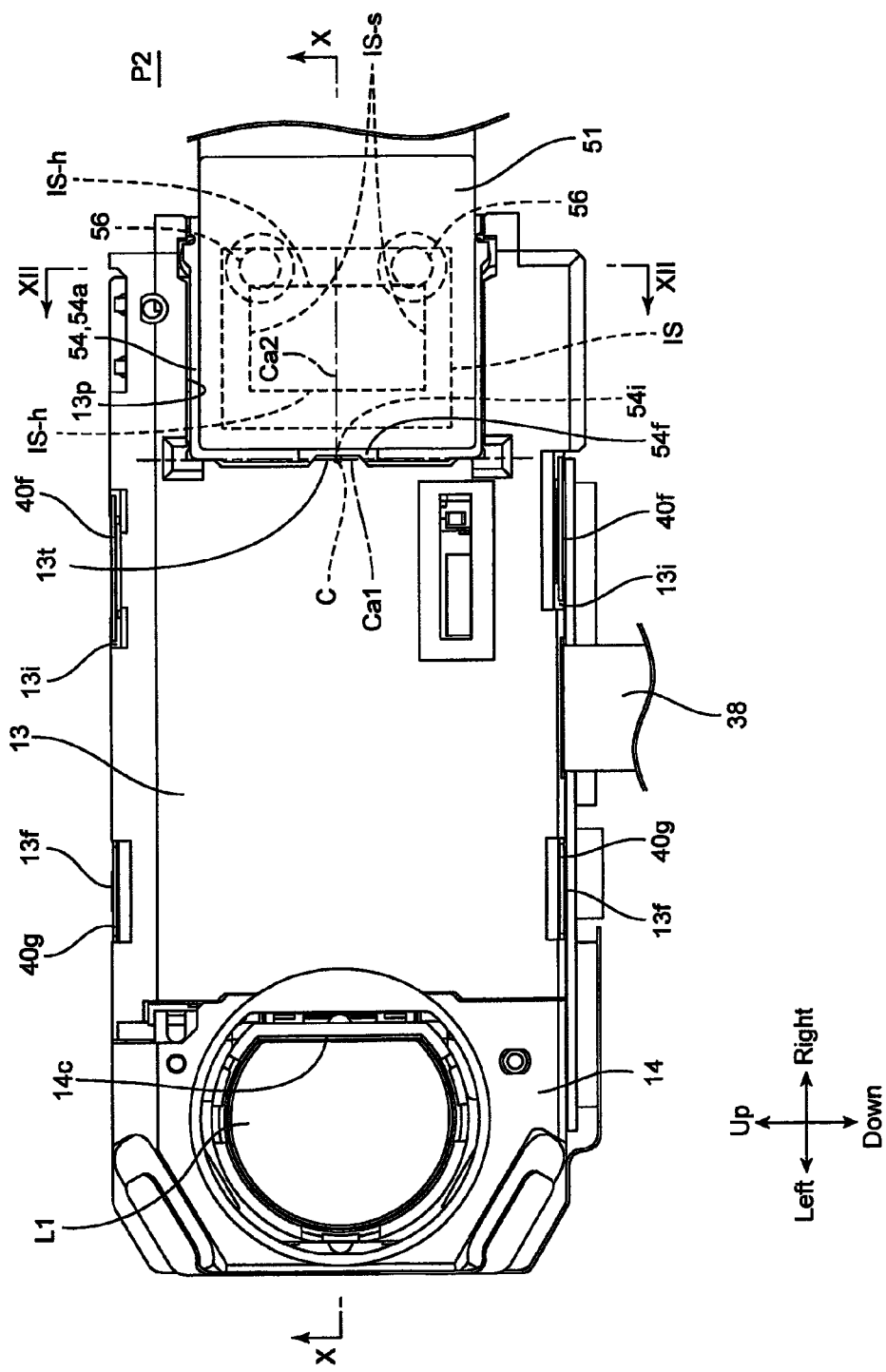
FIG. 5 is a front elevational view of the bending imaging apparatus.
Figure 6:
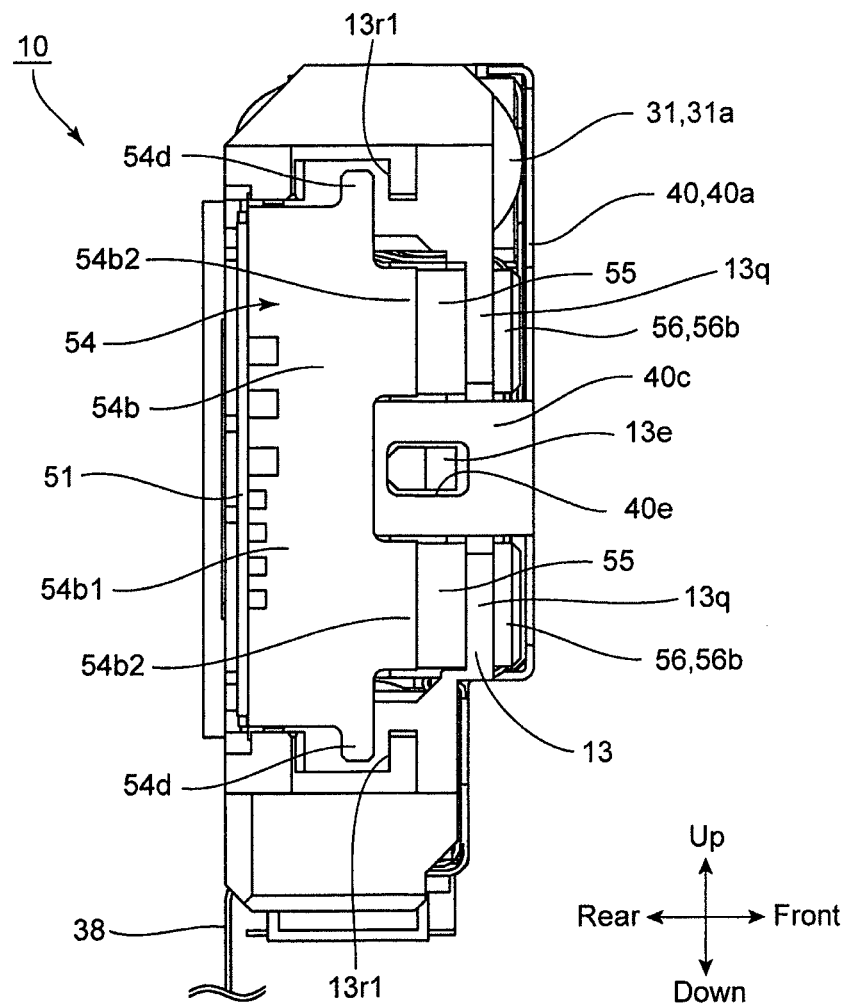
FIG. 6 is a side elevational view of the bending imaging apparatus.
Figure 9:
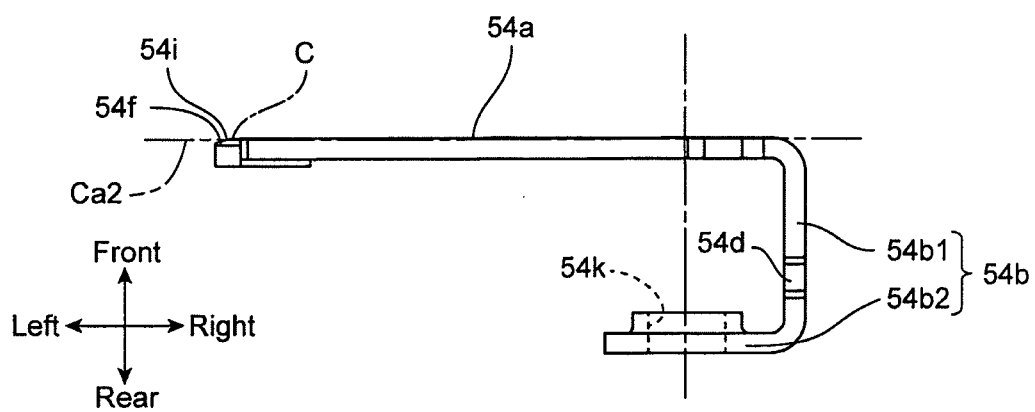
FIG. 9 is a bottom view of the inclination adjusting body of the bending imaging apparatus.
Figure 10:
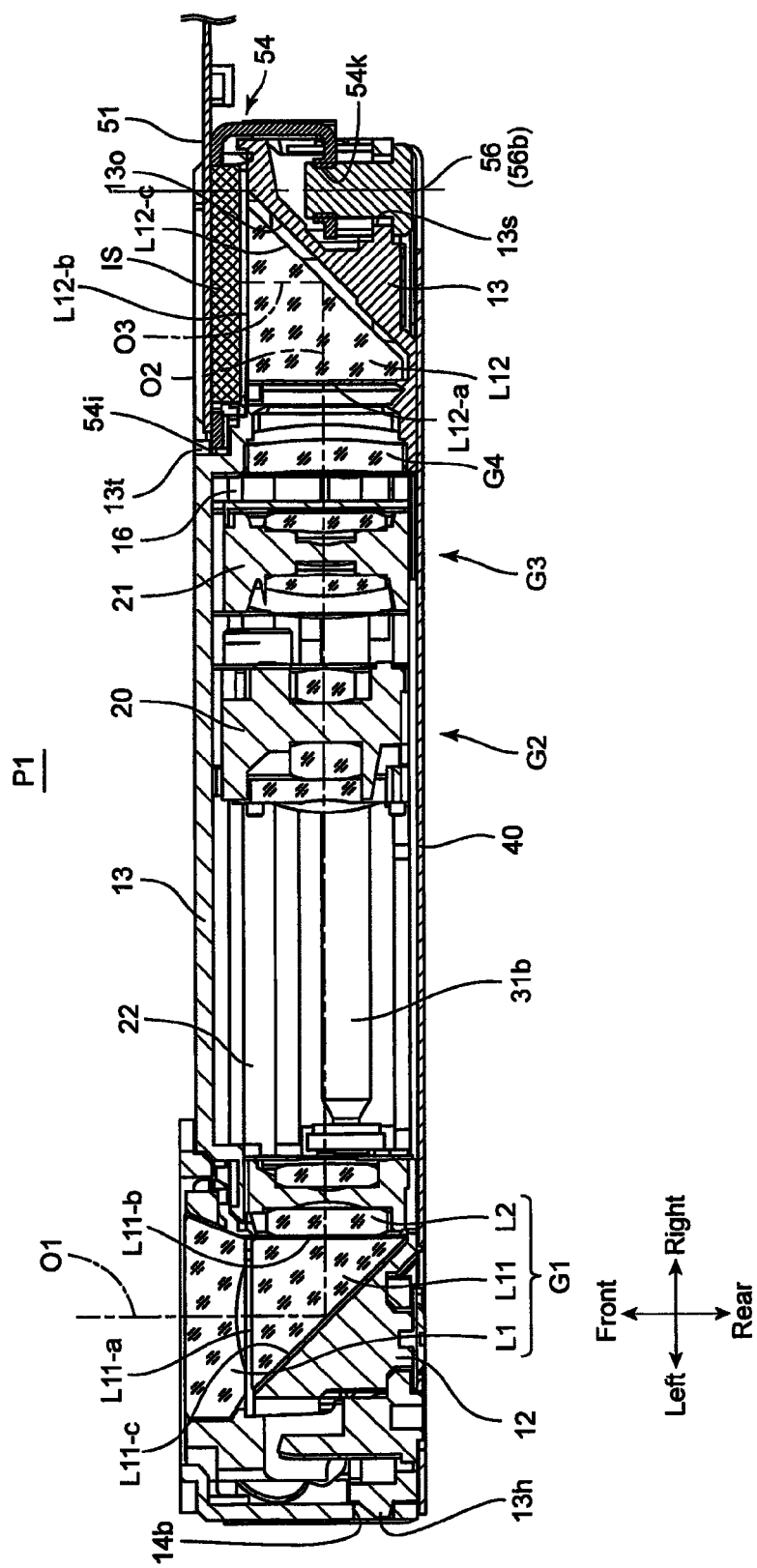
FIG. 10 is a longitudinal sectional view taken along the line X-X shown in FIG. 5.
Figure 11:
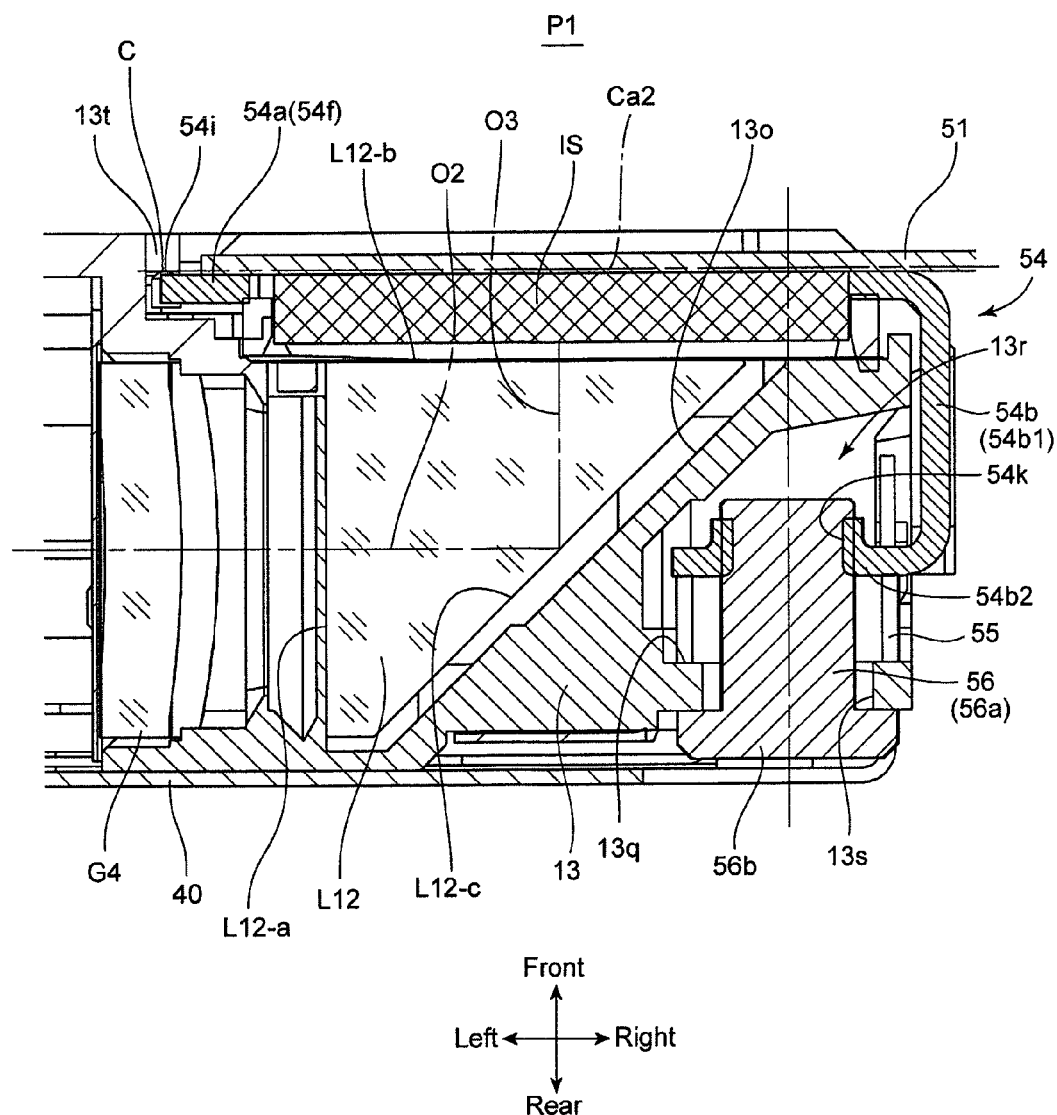
FIG. 11 is an enlarged sectional view of part of the bending imaging apparatus, which is shown in FIG. 10.
Figure 12:
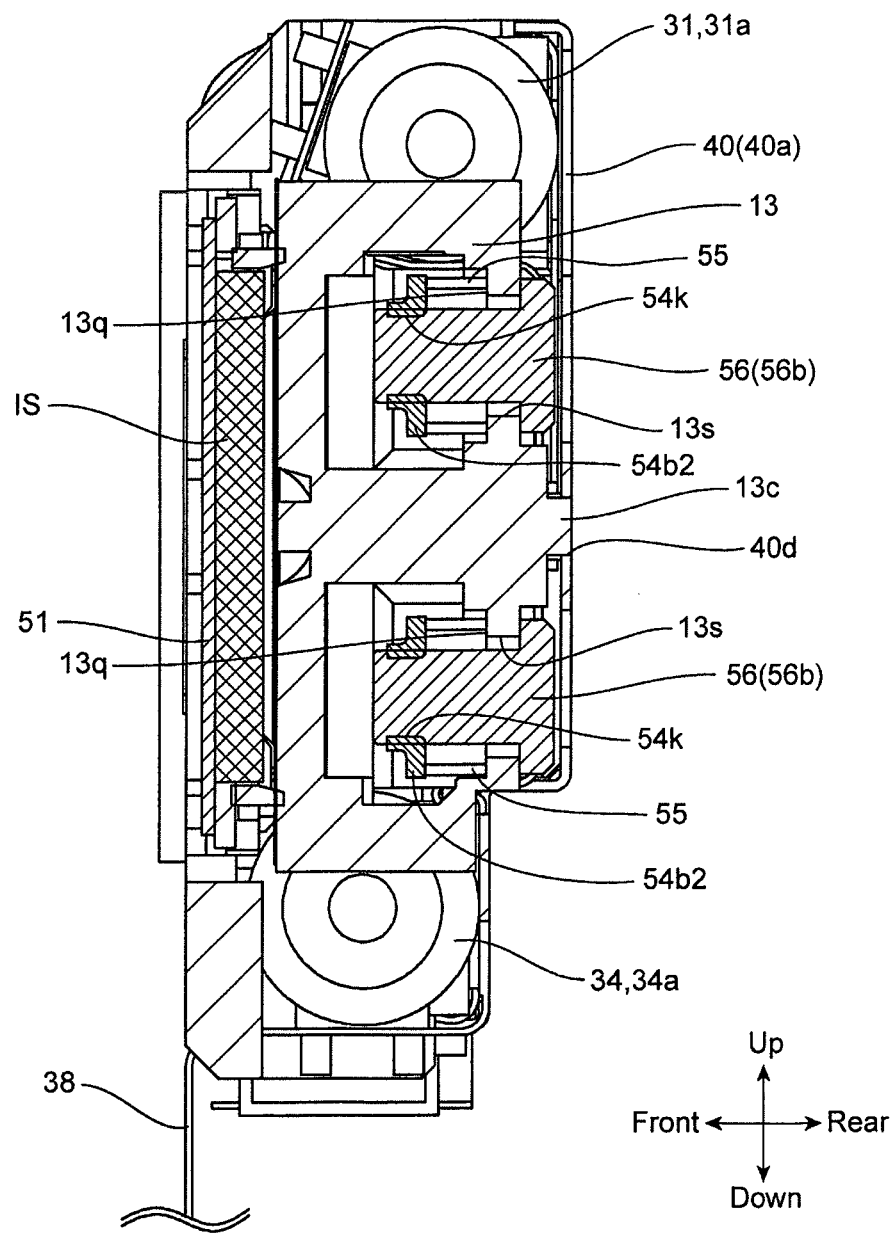
FIG. 12 is a sectional view taken along the line XII-XII shown in FIG. 5.

As shown in FIG. 9, the bending imaging apparatus 10 has an imaging optical system which is provided with a first lens group (front lens group) G1, a second lens group (movable lens group) G2, a third lens group (movable lens group) G3 and a fourth lens group G4. The first lens group G1 is provided with a first prism (bending optical element) L11, and the bending imaging apparatus 10 is provided on the image side (the right-hand side with respect to FIG. 10) of the fourth lens group G4 with a second prism (bending optical element) L12. The imaging optical system of the bending imaging apparatus 10 is configured as a bending optical system which reflects (bends) an object light bundle (light reflected by an object (photographic object)) at substantially right angles at each of the first prism L11 and the second prism L12. The first lens group G1 is configured of a first lens element (front lens element) L1, the first prism L11 and a second lens element L2. The first lens element L1 is positioned in front of (on the object side of) an incident surface L11-$a$ of the first prism L11, while the second lens element L2 is positioned on the right-hand side (the image side) of an exit surface L11-$b$ of the first prism L11. Each of the second lens group G2, the third lens group G3 and the fourth lens group G4 is a lens group which does not include a reflector element such as a prism. The second prism L12 constitutes a bending optical element which bends an object light bundle emanating from the imaging optical system (the first through fourth lens groups G1 through G4). In the following descriptions, the optical axis of the first lens group G1 is referred to as the first optical axis (pre-bending optical axis) O1, the optical axis which extends from the second lens group G2 to the fourth lens group G4 is referred to as the second optical axis (pre-bending optical axis/movable lens group optical axis) O2, and the optical axis of the imaging optical system after being optically bent by the second prism L12 is referred to as the third optical axis (post-bending optical axis) O3. The third optical axis O3 constitutes the post-bending optical axis of the second prism L12. The first optical axis O1, the second optical axis O2 and the third optical axis O3 lie in a plane P1 (see FIGS. 10 and 11), and the first optical axis O1 and the third optical axis O3 are parallel to each other. In FIGS. 10 and 11, the plane P1 is parallel to the sheet of the drawing. A plane which passes through the second optical axis O2 and is orthogonal to the plane P1 (the sheet of the drawing) in FIG. 10 is referred to as a plane P2 (see FIG. 5). In FIG. 5, the plane P2 is parallel to the sheet of the drawing.

Figure 2:
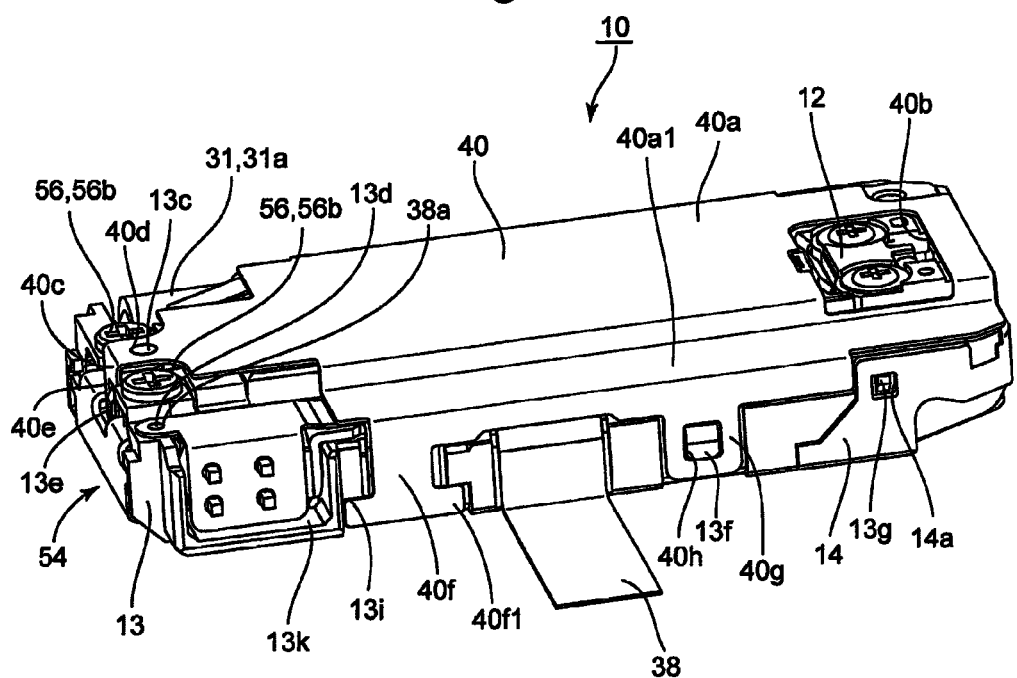
FIG. 2 is a perspective view of the bending imaging apparatus viewed from the opposite side with respect to FIG. 1.
Figure 3:
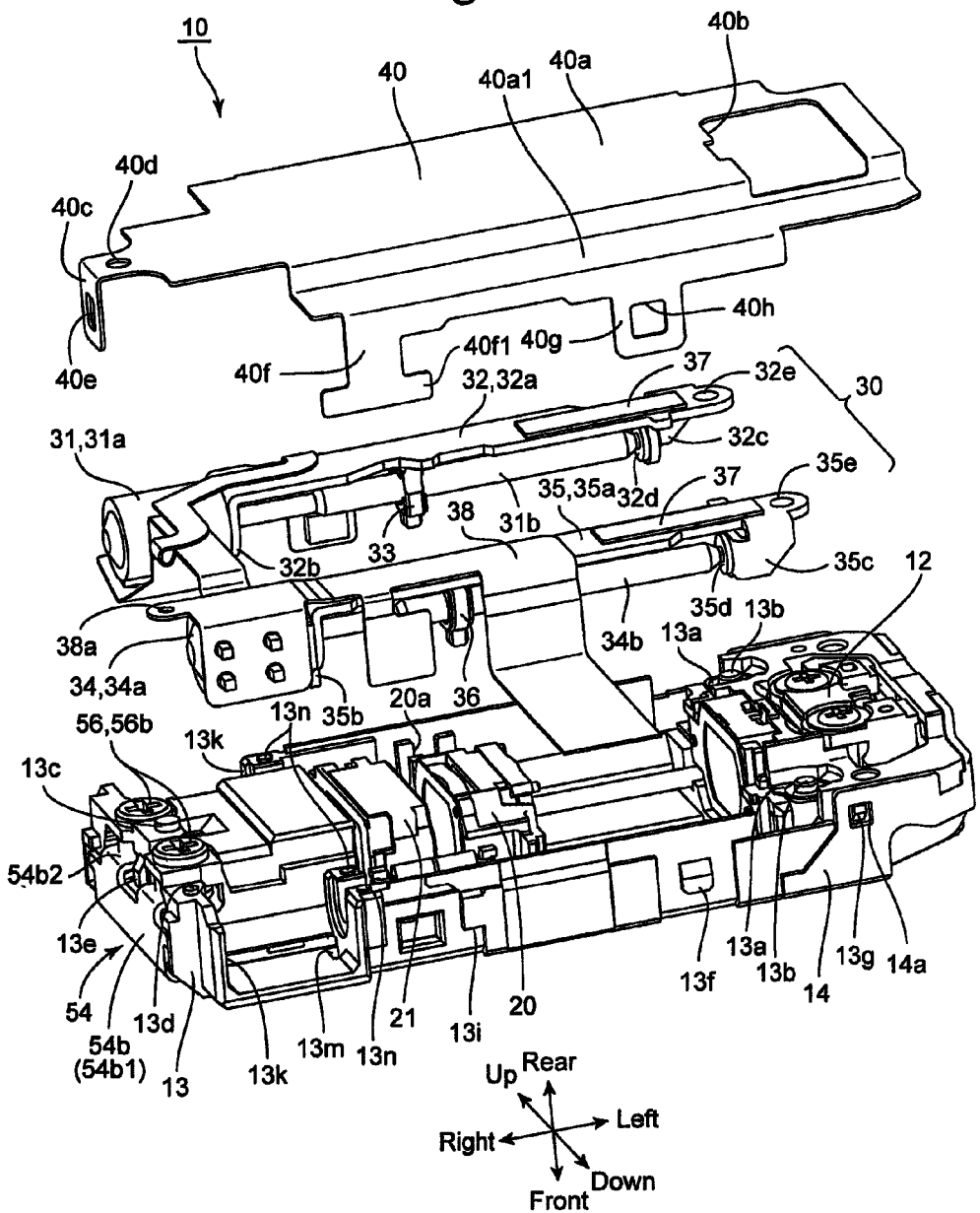
FIG. 3 is an exploded perspective view of the bending imaging apparatus.

As shown in FIG. 10, a light bundle emanating from an object and incident on the first lens element L1 along the first optical axis O1 enters the first prism L11 through the incident surface L11-$a$ and is reflected by a reflecting surface L11-$c$ of the first prism L11 in a direction along the second optical axis O2 to exit from the exit surface L11-$b$ of the first prism L11. Subsequently, the light bundle emanating from the exit surface L11-$b$ passes through the second lens element L2 of the first lens group G1 and the second, third and fourth lens groups G2, G3 and G4, which lie on the second optical axis O2, and enters the second prism L12 through an incident surface L12-$a$ thereof. Subsequently, the light bundle which is passed through the incident surface L12-$a$ is reflected by a reflection surface L12-$c$ of the second prism L12 in a direction along the third optical axis O3 and is incident on the imaging surface of an image sensor (image pickup device) IS to form an object image thereon. As shown in FIGS. 1 through 3, the bending imaging apparatus 10 is provided with a housing 13, a first-lens-group unit cover 14, a motor unit 30 and a retaining cover 40. The housing 13 houses the first lens group G1, the second lens group G2, the third lens group G3, the fourth lens group G4, the second prism L12 and the image sensor IS.

The housing 13 is a box-shaped member, the rear of which is entirely open. In addition, left and right portions of the front of the housing 13 are open. The housing 13 is elongated along the second optical axis O2 (along the lateral direction) and is small in thickness (slim) in the directions of the first optical axis O1 and the third optical axis O3. The bending imaging apparatus 10 is provided, at one end (the left end with respect to FIGS. 1, 2 and 3) of the housing 13 in the lengthwise direction (the lateral direction) thereof, with a first lens-group unit 12 which holds the first lens group G1; and the fourth lens group G4, the second prism L12 and the imaging sensor IS are fixedly held at the other end (the right end) of the housing 13 in the lengthwise direction thereof. The image sensor IS is connected, via a sensor board (flexible wiring board) 51 (see FIGS. 5, 6, 7, 10, 11 and 12), to a drive control circuit of a mobile electronic device (not shown) in which the bending imaging apparatus 10 is incorporated.

As shown in FIG. 3, the housing 13 is provided, in the rear surface of a left part of the housing 13, with an upper and lower pair of bracket-support recessed portions 13a and is provided, at the bottom of each of the pair of bracket-support recessed portions 13a, with a left bracket-support projection 13b having the shape of a column which projects rearward. On the other hand, the housing 13 is provided, on the rear surface of a right part of the housing 13, with a rear cover-catch projection 13c and a FPC-catch projection 13d, both of which project rearward. The FPC-catch projection 13d is positioned below the rear cover-catch projection 13c. The housing 13 is further provided on a right end surface thereof with a right retaining-cover-catch projection 13e. The housing 13 is further provided on each of top and bottom surfaces thereof with a side cover-catch projection 13f and a first-lens-group-unit cover-catch projection 13g. The housing 13 is further provided on a left end surface thereof with an upper and lower pair of first-lens-group-unit cover-catch projections 13h. The housing 13 is further provided on each of top and bottom surfaces thereof with a retaining-cover engaging recess 13i. The housing 13 is further provided on each of the top and bottom sides of the right end of the housing 13 with a motor housing recess 13k (see FIGS. 2 and 3). The housing 13 is provided in the upper and lower motor housing recesses 13k with upper and lower engaging grooves 13m in which upper and lower motor support lugs 32b and 35b which project from a second-lens-group drive motor support bracket 32 and a third-lens-group drive motor support bracket 35 are engaged, respectively. The housing 13 is provided, in a wall thereof on the immediate left side of the upper motor housing recess 13k, with an insertion groove in which a lead screw 31b extending from a second-lens-group drive motor 31 is inserted, and is further provided, at positions on two rear end surfaces of the aforementioned wall on the vertically opposite sides of the aforementioned insertion groove (i.e., on the vertically opposite sides of the lead screw 31b), with two motor bracket receiving protrusions 13n, respectively, and the housing 13 is provided, in a wall thereof on the immediate left side of the lower motor housing recess 13k, with an insertion groove in which a lead screw 34b extending from a third-lens-group drive motor 34 is inserted, and is further provided, at positions on two rear end surfaces of the aforementioned wall on the vertically opposite sides of the aforementioned insertion groove (i.e., on the vertically opposite sides of the lead screw 34b), with two motor bracket receiving protrusions 13n, respectively. Although each motor bracket receiving protrusion 13n can be formed integrally with the housing 13, each motor bracket receiving protrusion 13n can also be made of an elastic or low-repulsive material such as sponge as a separate member from the housing 13 and be fixed to the housing 13.

As shown in FIGS. 1 and 2, the bending imaging apparatus 10 is provided with a first-lens-group unit cover 14 which is fitted on a left portion of the housing 13. The first-lens-group unit cover 14 is provided in each of the upper and lower walls thereof with an engaging hole 14a in which the associated first-lens-group-unit cover-catch projection 13g of the housing 13 is engaged, and the first-lens-group unit cover 14 is provided in the left wall thereof with two (upper and lower) engaging holes 14b in which the upper and lower pair of first-lens-group-unit cover-catch projections 13h are engaged, respectively. The first-lens-group unit cover 14 remains fitted on the housing 13 by engagement of each first-lens-group-unit cover-catch projection 13h in the associated engaging hole 14b of the first-lens-group unit cover 14, respectively, and engagement of each first-lens-group-unit cover-catch projection 13g in the associated engaging hole 14a. In addition, the first-lens-group unit cover 14 is provided on a front surface thereof with a lens exposing opening 14c, through which the first lens group L1 is exposed toward the front of the bending imaging apparatus 10 (see FIG. 1).

Figure 4:
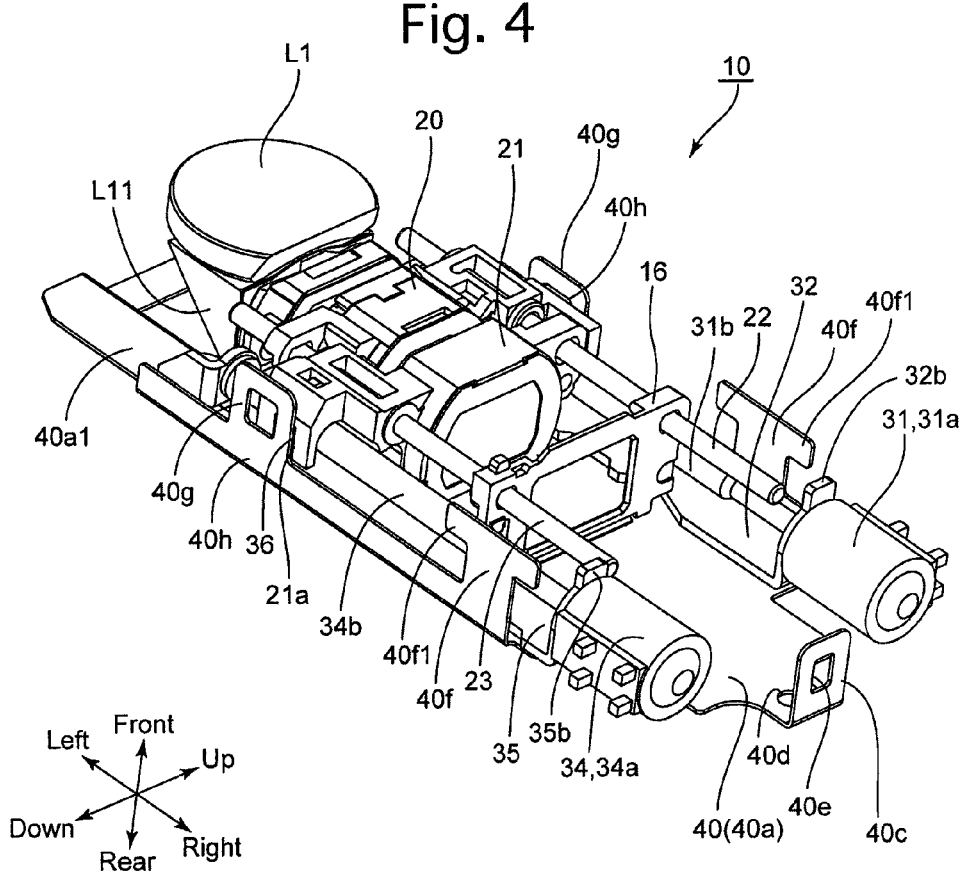
FIG. 4 is a perspective view of an internal structure of the bending imaging apparatus.

The bending imaging apparatus 10 is provided, in the housing 13, with an upper and lower pair of rods 22 and 23 parallel to the second optical axis O2. Both ends (the left and right ends) of each rod 22 and 23 are fixed inside of the housing 13. As shown in FIG. 4, etc., the second lens group G2 and the third lens group G3 are held by a second lens group frame 20 and a third lens group frame 21, respectively, which are supported to be movable along the second optical axis O2 by the pair of rods 22 and 23. Each of the second lens group frame 20 and the third lens group frame 21 is provided with an upper and lower pair of through-holes which are slidably fitted on the pair of rods 22 and 23, respectively.

As shown in FIG. 3, the motor unit 30 is provided with the second lens group drive motor 31, the second-lens-group drive motor support bracket 32, a nut 33, the third-lens-group drive motor 34, the third-lens-group drive motor support bracket 35, a nut 36, cushioning members (elastic material) 37 and a flexible printed wiring board 38.

The second lens group drive motor 31 is integrally provided with a motor body 31a and a lead screw 31b which projects leftward from the motor body 31a. The second lens group drive motor 31 is rotatable on the axis of the lead screw 31b that is parallel to the second optical axis O2. The female screw hole formed through the nut 33 is screw-engaged with the lead screw 31b of the second lens group drive motor 31.

The second-lens-group drive motor support bracket (motor support bracket) 32 is formed from a metal plate by press-molding and is generally in the shape of a plate extending in the leftward and rightward directions. The second-lens-group drive motor support bracket 32 is provided with a main body (planar portion) 32a, the aforementioned motor-body support lug 32b and a screw support lug (screw support portion) 32c (see FIG. 3). The main body 32a is planar in shape in directions orthogonal to the forward and rearward directions, the motor-body support lug 32b extends forward from the right end of the main body 32a, and the screw support lug 32c extends forward from a portion of the lower edge of the main body 32a in the vicinity of the left end thereof. The motor-body support lug 32b is provided with a circular through-hole through which the lead screw 31b extends, parallel to the second optical axis O2. The right end of the screw support lug 32c (the end of the screw support lug 32c on the second-lens-group drive motor 31 side) is formed from a plate-like portion lying in a plane orthogonal to the leftward and rightward directions, a circular though-hole coaxial with the circular through-hole of the motor-body support lug 32b is formed through this plate-like portion, and a bearing 32d is fitted into this circular through-hole. The main body 32a is provided at the left end thereof with an engaging hole (through-hole) 32e, which is engageable with the associated (upper) left bracket-support projection 13b of the housing 13. One of the aforementioned cushioning members 37 that is made of an elastic material is adhered to a rear surface of the main body 32a.

As shown in FIGS. 2, 3 and 4, the second-lens-group drive motor 31, the lead screw 31b of which is screw-engaged with the nut 33, is fixedly mounted to the second-lens-group drive motor support bracket 32. Specifically, with the lead screw 31b positioned immediately in front of the main body 32a through the aforementioned circular through-hole of the motor body support lug 32b, the left end of the lead screw 31b is rotatably supported by the bearing 32d that is fitted into the screw support lug 32c, and the left side of the motor 31a is fixed to the right side of the motor body support lug 32b.

The third-lens-group drive motor 34 is identical in specification to the second-lens-group drive motor 31 and is provided with a motor body 34a and a lead screw 34b which correspond to the motor body 31a and the lead screw 31b, respectively.

A nut 36 identical in specification to the nut 33 is screw-engaged with the lead screw 34b of the third-lens-group drive motor 34.

As shown in FIGS. 3, 4, etc., the third-lens-group drive motor support bracket (motor support bracket) 35 is formed from a material that is identical to that of the second-lens-group drive motor support bracket 32, and the third-lens-group drive motor support bracket 35 and the second-lens-group drive motor support bracket 32 are substantially symmetrical in shape in the vertical direction. Namely, the third-lens-group drive motor support bracket 35 is provided with a main body (planar portion) 35a, the aforementioned motor-body support lug 35b, a screw support lug (screw support portion) 35c, a bearing 35d, and an engaging hole (through-hole) 35e which correspond to the main body 32a, the motor-body support lug 32b, the screw support lug 32c, the bearing 32d, and the engaging hole 32e of the second-lens-group drive motor support bracket 32, respectively. The other of the aforementioned cushioning members 37 is adhered to a rear surface of the main body 35a (see FIG. 3). The third-lens-group drive motor 34, the lead screw 34b of which is screw-engaged with the nut 36, is fixedly mounted to the third-lens-group drive motor support bracket 35 in a fixing manner similar to that in which the second-lens-group drive motor 31 (the nut 33) is fixed to the second-lens-group drive motor support bracket 32.

The flexible printed wiring board 38 is a wiring member which connects a power supply and a control circuit, which are provided outside the bending imaging apparatus 10, to the second-lens-group drive motor 31 and the third-lens-group drive motor 34. The flexible printed wiring board 38 is routed along the second-lens-group drive motor support bracket 32 and the third-lens-group drive motor support bracket 35, and terminals of the motor bodies 31a and 34a are connected to a circuit pattern printed on the flexible printed wiring board 38. The flexible printed wiring board 38 is provided, in the vicinity of a portion thereof which is connected to the motor body 34a, with a mounting hole 38a.

The motor unit 30 that has the above described structure is installed in the housing 13 from behind while the motor body 31a and the motor body 34a are housed in the upper and lower motor housing recesses 13k, respectively, and while the motor body support lug 32b and the motor-body support lug 35b are being fitted into the upper and lower engaging grooves 13m, respectively. The upper and lower left bracket-support projections 13b of the housing 13 are engaged in the engaging holes 32e and 35e, respectively, while the left end of the main body 32a of the second-lens-group drive motor support bracket 32 and the left end of the main body 35a of the third-lens-group drive motor support bracket 35 are engaged in the upper and lower pair of bracket-support recessed portions 13a, respectively. In addition, the FPC-catch projection 13d of the housing 13 is engaged in the mounting hole 38a of the flexible printed wiring board 38 (see FIG. 3). The second-lens-group drive motor support bracket 32 is positioned and supported with respect to the housing 13 in the forward and rearward directions by the abutment of both the left and right ends thereof against the upper bracket-support recessed portion 13a and the associated two motor bracket receiving protrusions 13n, and the third-lens-group drive motor support bracket 35 is positioned and supported with respect to the housing 13 in the forward and rearward directions by the abutment of both the left and right ends thereof against the lower bracket-support recessed portion 13a and the associated two motor bracket receiving protrusions 13n.

The nut 33 is engaged in a nut-engaging recessed portion 20a (see FIG. 3) formed in the second lens group frame 20, and the nut 36 is engaged in a nut-engaging recessed portion 21a (see FIG. 4) formed in the third lens group frame 21. Therefore, the nut 33 and the second lens group frame 20 integrally move (with each other) along the second optical axis O2, and the nut 36 and the third lens group frame 21 integrally move (with each other) along the second optical axis O2. As viewed in the forward or rearward direction, the second lens group frame 20, the third lens group frame 21 and a light shield frame 16 are positioned between the second-lens-group drive motor support bracket 32 and the third-lens-group drive motor support bracket 35. In addition, the second lens group frame 20, the third lens group frame 21 and the light shield frame 16 are partly positioned in a plane in which the main body 32a and the main body 35a lie.

The retaining cover 40 is a press-molded product made of a resilient metal plate and is provided with a planar main body portion 40a and a stepped portion 40a1 (see FIG. 3). The planar main body portion 40a lies in a plane orthogonal to the forward and rearward directions. The stepped portion 40a1 is formed at a different position from the planar main body portion 40a in the forward and rearward direction and extends in the leftward and rightward directions along the planar main body portion 40a. The retaining cover 40 is further provided with a first engaging lug 40c, two (upper and lower) second engaging lugs 40f and two (upper and lower) third engaging lugs 40g. The first engaging lug 40c projects (bends) forward from the right edge of the planar main body portion 40a. Each of the upper second engaging lug 40f and the upper third engaging lug 40g projects forward from an edge (upper edge) of the planar main body portion 40a, and each of the lower second engaging lug 40f and the lower third engaging lug 40g projects forward from an edge (lower edge) of the stepped portion 40a1. The planar main body portion 40a is provided in the vicinity of the left end thereof with an exposing hole 40b, through which the first lens-group unit 12 is exposed rearwardly. The planar main body portion 40a is provided in the vicinity of the right end thereof with a circular engaging hole 40d. The first engaging lug 40c is provided with a rectangular engaging hole 40e, each third engaging lug 40g is provided with a square engaging hole 40h, and each second engaging lug 40f is provided at the end thereof with an elongated engaging protrusion 40f1 which is elongated in the leftward and rightward directions so that each second engaging lug 40f has the shape of a letter T.

As shown in FIGS. 1 and 2, the retaining cover 40 is fixedly mounted to the housing 13 by engaging the circular engaging hole 40d of the planar main body portion 40a with the rear cover-catch projection 13c of the housing 13, engaging the rectangular engaging hole 40e of the first engaging lug 40c with the right retaining-cover-catch projection 13e, engaging the square engaging hole 40h of each third engaging lug 40g with the associated side cover-catch projection 13f, and engaging the elongated engaging portion 40f1 of each second engaging lug 40f with the retaining-cover engaging recess 13i while fitting the planar main body portion 40a and the stepped portion 40a1 onto the rear surfaces of the housing 13 and the motor unit 30 from the rear.

Upon the retaining cover 40 being mounted onto the housing 13, the front of the planar main body portion 40a presses the cushioning member 37 provided on the second-lens-group drive motor support bracket 32 from the rear, while the front of the stepped portion 40a1 presses the cushioning member 37 provided on the third-lens-group drive motor support bracket 35 from the rear. Namely, the motor unit 30 (which includes the second lens group drive motor 31, the second-lens-group drive motor support bracket 32, the third-lens-group drive motor 34 and the third-lens-group drive motor support bracket 35) is sandwiched between the housing 13 and the retaining cover 40 in the forward and rearward directions, thus being positioned with respect to the housing 13 in the forward and rearward directions. In addition, the rear end of the first lens-group unit 12 is exposed through the exposing hole 40b of the retaining cover 40.

Making battery power of the aforementioned mobile electronic device capable of being supplied to the second lens group drive motor 31 and the third-lens-group drive motor 34 via the aforementioned drive control circuit and the flexible printed wiring board 38 of the bending imaging apparatus 10 by connecting the flexible printed wiring board 38 to the aforementioned drive control circuit enables each of the second lens group drive motor 31 and the third-lens-group drive motor to operate. In addition, the imaging optical system performs a zooming operation and a focusing operation by moving the second lens group frame 20 (the second lens group G2) and the third lens group frame 21 (the third lens group G3) independently of each other along the rods 22 and 23 using the second-lens-group drive motor 31 and the third-lens-group drive motor 34, which makes it possible to photograph an object image in a zoomed and focused state.

Figure 7:
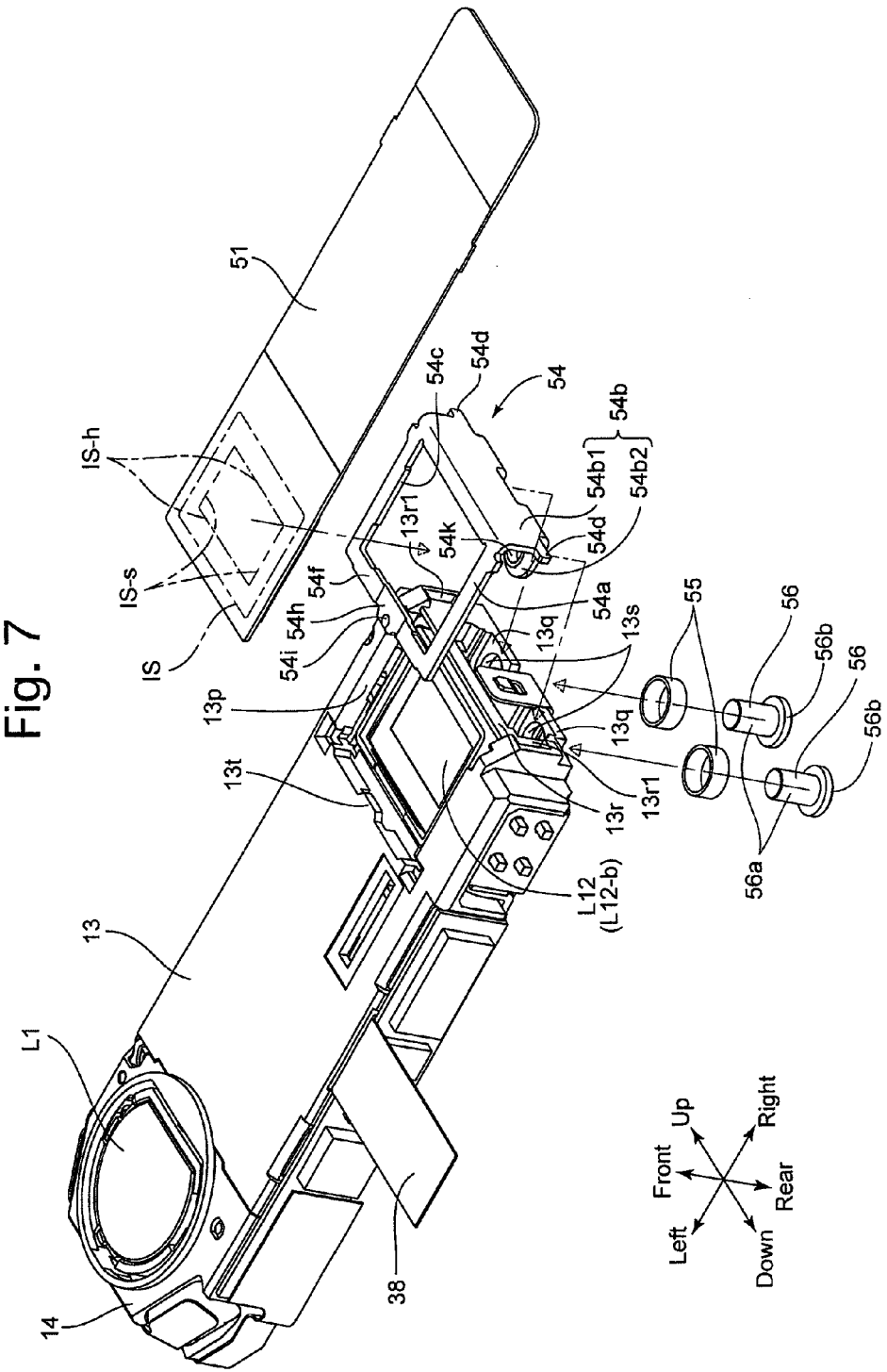
FIG. 7 is an exploded perspective view of the bending imaging apparatus, showing a mechanism for adjusting the inclination of an image sensor in an exploded state.
Figure 8:
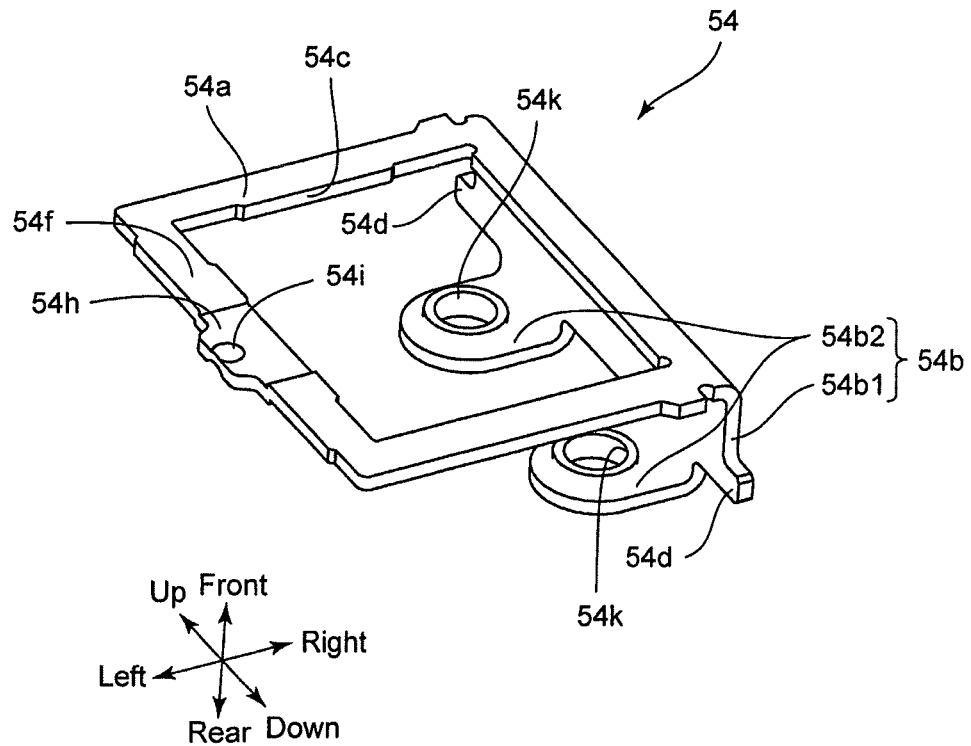
FIG. 8 is a perspective view of an inclination adjusting body provided as an element of the bending imaging apparatus.

FIGS. 5 through 12 show an embodiment of a mechanism for adjusting the inclination of the image sensor IS, which is positioned on the third optical axis O3 that is bent by the reflecting surface L12-c at an angle relative to the second optical axis O2. In this embodiment, the image sensor IS is rectangular in a plan view, and includes a pair of mutually opposed long sides IS-h and a pair of mutually opposed short sides IS-s as shown in FIG. 5. The long sides IS-h of the image sensor IS correspond to long sides of an exit surface L12-b of the second prism L12 and the short sides IS-s of the image sensor IS correspond to the short sides of the exit surface L12-b. The image sensor IS is fixed to the sensor board 51. According to design specifications, the pair of long sides IS-h are parallel to the plane P2, lie in a plane orthogonal to the third optical axis O3, and are positioned to extend orthogonally to the second optical axis O2 in a plan view (as viewed along the third optical axis O3). The pair of short sides IS-s are parallel to the second optical axis O2. The housing 13 is provided at the right end thereof with a prism retaining wall 13o (see FIGS. 10 and 11) which holds the second prism L12, and a rectangular opening 13p (see FIGS. 1, 5 and 7) which houses an inclination adjusting body 54, the sensor board 51, etc., in front of the exit surface L12-b. The inclination adjusting body 54 is positioned between the sensor board 51 and the rectangular opening 13p. The inclination adjusting body 54 and the sensor board 51 are fixed to each other with an adhesive; however, FIGS. 1 and 7 show a state before the inclination adjusting body 54 and the sensor board 51 are fixed to each other.

The inclination adjusting body 54 is provided with a mounting plate portion 54a and an inclination-adjusting bent plate portion 54b. The image sensor IS is fixedly mounted onto the mounting plate portion 54a, and the inclination-adjusting bent plate portion 54b is formed continuous with the mounting plate portion 54a and extends toward the underside of the second prism L12 (toward the rear of the exit surface L12-b). A rectangular opening 54c, through which the image sensor IS is exposed, is formed in the mounting plate portion 54a. The inclination-adjusting bent plate portion 54b is formed in the shape of a letter L in cross section, extending perpendicularly from the right end of the mounting plate portion 54a. The inclination-adjusting bent plate portion 54b is provided with a flat plate portion 54b1 and a pair of screw-engagement portions 54b2. The flat plate portion 54b1 extends parallel to the third optical axis O3, and the pair of screw-engagement portions 54b2 extend from the rear end of the flat plate portion 54b1 toward the reflecting surface L12-c of the second prism L12 in a direction parallel to the mounting plate portion 54a (i.e., parallel to the second optical axis O2) (see FIGS. 7, 8 and 9). The pair of screw-engagement portions 54b2 are positioned near both ends of the flat plate portion 54b1, respectively, in the widthwise direction (the vertical direction) of the bending imaging apparatus 10, thus being spaced from each other along the pair of long sides IS-h of the image sensor IS. A female thread portion (screw-thread portion) 54k is formed in each screw-engagement portion 54b2 in the vicinity of the end (the left end) thereof upon each hole in which the corresponding female thread portion 54k is to be formed being burred. In addition, the flat plate portion 54b1 is provided, at both ends thereof in the widthwise direction thereof (the widthwise direction (the vertical direction) of the bending imaging apparatus 10), with a pair of limit projections 54d, respectively.

On the other hand, the housing 13 is provided with an accommodating space 13r between the prism retaining wall 13o and base side walls 13q (see FIGS. 6, 7, 11 and 12) of the housing 13. The accommodating space 13r accommodates the pair of screw-engagement portions 54b2, and the pair of screw-engagement portions 54b2 extend toward the reflecting surface L12-c of the second prism L12 in the accommodating space 13r (see FIGS. 9 and 10). Additionally, the housing 13 is provided with a pair of upper and lower limit grooves 13r1 which respectively receive the pair of limit projections 54d (see FIGS. 6 and 7). A pair of screw insertion holes 13s, the axes of which are parallel to the third optical axis O3, are formed through the base side walls 13q to correspond to the female thread portions 54k of the pair of screw-engagement portions 54b2, respectively.

The bending imaging apparatus 10 is provided with two compression springs (biaser) 55 that are installed between the base side walls 13q and the pair of screw-engagement portions 54b2, respectively, in a compressed state to bias the inclination adjusting body 54 in a direction to bring the mounting plate portion 54a away from the housing 13 (i.e., in the forward direction). A pair of adjustment screws (adjustment screw members) 56 are respectively inserted inside the compression springs 55 through the pair of screw insertion holes 13s of the housing 13 so that screw-thread portions 56a of the pair of adjustment screws 56 are screw-engaged with the female thread portions 54k of the pair of screw-engagement portions 54b2, respectively. Large-diameter head portions 56b of the pair of adjustment screws 56 are in contact with the bottom side walls 13q. Accordingly, the positions of the pair of screw-engagement portions 54b2 in the forward and rearward directions (the inclination of the inclination adjusting body 54) vary by adjusting the engagement positions of the female thread portions 54k of the pair of screw-engagement portions 54b2 relative to the pair of adjustment screws 56, respectively. Extension lines of the axes of the pair of adjustment screws 56 (and the two compression springs 55 and the female thread portions 54k) are positioned inside the planar outline of the image sensor IS (the sensor board 51), though positioned outside the planar outline of the second prism L12 (the exit surface L12-b) (see FIG. 5), which prevents the bending imaging apparatus 10 from increasing in length in the direction of the second optical axis O2 (i.e., in the lateral direction).

The inclination adjusting body 54 is provided with a recessed portion 54h on an inner side (left side) marginal portion 54f of the mounting plate portion 54a (which is positioned on the opposite side of the mounting plate portion 54a from the inclination-adjusting bent plate portion 54b side) at the center of the inner frame portion 54f in the lengthwise direction thereof. The recessed portion 54h is recessed a step toward the plane P2 (toward the second optical axis O2/rearward). The inclination adjusting body 54 is further provided with a swing pivot protrusion (swing pivot portion) 54i at a central position (relative to the upward/downward direction) on the base of the recessed portion 54h on the opposite side (the front side) of the inclination adjusting body 54 from the plane P2. The swing pivot protrusion 54i is formed to protrude forward, i.e., in a direction away from the plane P2. The swing pivot protrusion 54i is formed by, e.g., embossing.

On the other hand, the housing 13 is provided with a contact portion 13t which is formed like an overhanging projection that projects toward the inclination adjusting body 54, i.e., rightward, to come in contact with the swing pivot protrusion 54i. The swing pivot protrusion 54i comes in contact with the contact portion 13t from the second optical axis O2 side (from the plane P2 side). Due to the engagement relationship between the swing pivot protrusion 54i and the contact portion 13t, the inclination-adjusting bent plate portion 54b can be moved to tilt (swing) the inclination adjusting body 54 about the contact point, serving as a swing pivot (swing center) C, at which the swing pivot protrusion 54i is in contact with the contact portion 13t. The pair of limit grooves 13r1 and the pair of limit projections 54d define the swinging range of the inclination adjusting body 54 in the forward and rearward directions and the swinging range of the inclination adjusting body 54 in the upward and downward directions with the swing pivot C as a swing center on the inclination-adjusting bent plate portion 54b side.

The inclination adjusting mechanism for adjusting the inclination of the image sensor IS, which has the above described structure, is temporarily assembled by fixing the image sensor IS to the mounting plate portion 54a of the inclination adjusting body 54, inserting the pair of screw-engagement portions 54b2 of the inclination adjusting body 54 into the accommodating space 13r of the housing 13, bringing the swing pivot protrusion 54i into contact with the contact portion 13t of the housing 13, inserting the compression springs 55 in between the base side walls 13q and the pair of screw-engagement portions 54b2, and screw-engaging the screw-thread portions 56a of the pair of adjustment screws 56 with the female thread portions 54k of the pair of screw-engagement portions 54b2 (see FIGS. 7 and 10). In a state where the inclination adjusting mechanism is temporarily assembled in such a manner, the inclination adjusting body 54 can tilt (swing) about the swing pivot C.

In this temporarily assembled state, the inclination (and the position) of the image sensor IS in all directions (the inclinations of the pair of long sides IS-h and the pair of short sides IS-s relative to the plane P2) can be adjusted with the swing pivot C as a swing center by independently adjusting the amount of engagement of the pair of adjustment screws 56 with the female thread portions 54k of the pair of screw-engagement portions 54b2. The inclination adjusting body 54 can be made to swing (rotate), from the designed initial position thereof, about a first swing axis Ca1 (see FIGS. 5 and 13B) and a second swing axis Ca2 (see FIGS. 5, 13A). The imaginary first swing axis Ca1 is an imaginary straight line which passes through the swing pivot C and extends in a direction orthogonal to the plane P1 (see FIGS. 10 and 11) and parallel to both the plane P2 and the pair of screw-engagement portions 54b2, and the imaginary second swing axis Ca2 is an imaginary straight line which passes through the swing pivot C and extends in a direction orthogonal to the first swing axis Ca1 and parallel to both the second optical axis O2 and the plane P2. In FIG. 13A, the inclination adjusting body 54 (that includes the mounting plate portion 54a, the pair of limit projections 54d and the pair of screw-engagement portions 54b2) in the initial state is shown by solid lines, and the inclination adjusting body 54 which has swung about the second swing axis Ca2 is shown by two-dot chain lines. In FIG. 13B, the inclination adjusting body 54 (that includes the mounting plate portion 54a, the pair of limit projections 54d and the pair of screw-engagement portions 54b2) in the initial state is shown by solid lines, and the inclination adjusting body 54 which has swung about the first swing axis Ca1 is shown by two-dot chain lines. Additionally, in FIGS. 13A and 13B, the first swing axis Ca1 and the second swing axis Ca2 in the initial state are shown by one-dot chain lines, and the first swing axis Ca1 and the second swing axis Ca2 after the inclination adjusting body 54 has rotated are shown by two-dot chain lines. The inclination of the image sensor IS is finely adjusted by a combination of the swing (tilt) about the first swing axis Ca1 and the swing (tilt) about the second swing axis Ca2.

The point of contact between the swing pivot protrusion 54i and the contact portion 13t constitutes a swing pivot portion (the swing pivot C), and the pair of screw-engagement portions 54b2, the female thread portions 54k of the pair of screw-engagement portions 54b2, the pair of compression springs 55 and the pair of adjustment screws 56 constitute an inclination adjusting portion. Various techniques of adjusting the inclination of an image sensor are known in the art, and accordingly, the inclination of the image sensor IS can be adjusted by a different inclination adjusting technique. For instance, the inclination of the image sensor IS can be adjusted by inserting washers or shims in between the base side walls 13q and the large-diameter head portions 56b or by using at least one eccentric shaft.

Since the swing pivot protrusion 54i (the swing pivot C) of the present embodiment of the bending imaging apparatus is formed at a position offset toward the opposite side of the third optical axis O3 from the female thread portions 54k, as viewed in the third optical axis O3 direction (see FIGS. 10 and 11), the inclination of the image sensor IS can be adjusted by swinging (rotating/tilting) the image sensor IS about the swing pivot protrusion 54i.

Since the inclination adjusting mechanism, which is for adjusting the inclination of the image sensor IS, incorporated in the present embodiment of the bending imaging apparatus is structured so that the inclination-adjusting bent plate portion 54b (the pair of screw-engagement portions 54b2) and the pair of adjustment screws 56 are positioned behind the reflecting surface L12-c of the second prism L12 (i.e., the inclination-adjusting bent plate portion 54b and the pair of adjustment screws 56 overlap the second prism L12 as viewed along the third optical axis O3), the internal space of the bending imaging apparatus 10 behind the reflecting surface L12-c of the second prism L12 can be effectively utilized, which does not cause an increase in the dimensions of the housing 13 in the direction of the second optical axis O2.

Although the pair of long sides IS-h of the image sensor IS are orthogonal to the plane P1 (to lie in a plane orthogonal to the plane P1) in the above illustrated embodiment of the bending imaging apparatus, a different arrangement in which the pair of short sides IS-s of the image sensor IS orthogonal to the plane P1 is also possible. Additionally, the present invention is also applicable to the case where the image sensor IS is in the shape of a square (which can also be defined as a rectangle with all four equal sides thereof being equal) in a plan view (namely, the imaging surface of the image sensor IS is square in shape).

Although each compression spring 55 and the associated adjustment screw 56 are coaxially arranged in the above illustrated embodiment of the bending imaging apparatus, each compression spring 55 and the associated adjustment screw 56 can be arranged at different positions.

Although the present invention has been applied to the above described embodiment of the bending imaging apparatus in which the ends of the lead screws 31b and 34b are positioned on the first prism L11 side and in which the second lens group drive motor 31 and the third-lens-group drive motor 34 are positioned on the second prism L12 side, an embodiment of the bending imaging apparatus in which the ends of the lead screws 31b and 34b are positioned on the second prism L12 side and in which the second lens group drive motor 31 and the third-lens-group drive motor 34 are positioned on the first prism L11 side is also possible.

Although the above described embodiment of the bending imaging apparatus is provided with the first prism L11 and the second prism L12, the present invention is also applicable to a type of bending imaging apparatus which is provided with a bending optical element (e.g., a prism corresponding to the second prism L12) only at a position immediately in front of the image sensor IS.

Although three lens groups, i.e., the second lens group G2, the third lens group G3 and the fourth lens group G4 are arranged on the second optical axis O2 in the imaging optical system of the above illustrated embodiment of the bending imaging apparatus, the present invention can also be applied to an imaging optical system in which less than or more than three lens groups are arranged on an optical axis corresponding to the second optical axis O2.

Additionally, in the first lens group G1, it is possible to change the number of lens elements arranged in front of the incident surface L11-a of the first prism L11 on the first optical axis O1 and the number of lens elements arranged on the right-hand side (the image side) of the exit surface L11-b of the first prism L11 on the second optical axis O2.

Additionally, although the imaging optical system of the above illustrated embodiment of the bending imaging apparatus 10 is a zoom lens (variable power optical system) which performs a zooming operation (power varying operation) by moving the second lens group G2 and the third lens group G3 along the second optical axis O2, the present invention is also applicable to a bending imaging apparatus which incorporates an imaging optical system having no power varying capability. For instance, it is possible to modify the bending imaging apparatus 10 such that the second lens group G2 and the third lens group G3 do not move for a zooming operation and that the second lens group G2 or the third lens group G3 moves solely for a focusing operation.

Although the incident surface L11-a of the first prism L11 in the above illustrated embodiment of the bending imaging apparatus 10 is in the shape of a laterally elongated rectangle, the present invention can also be applied to a type of bending imaging apparatus (imaging optical system) having a first prism (which corresponds to the first prism L11) having a different shaped incident surface, such as a square or a trapezoid.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A bending imaging apparatus provided with an imaging optical system, a bending optical element which bends an object light bundle that emanates from said imaging optical system, an image sensor which is rectangular in a front view and positioned on a post-bending optical axis of said bending optical element, and a housing which supports said imaging optical system, said bending optical element and said image sensor, wherein said bending imaging apparatus comprises:
    an inclination adjusting body which includes a mounting plate portion, onto which said image sensor is fixedly mounted, and an inclination-adjusting bent plate portion which extends toward an underside of said bending optical element from said mounting plate portion;
    a swing pivot portion which is provided between said mounting plate portion of said inclination adjusting body and said housing to pivotally support said inclination adjusting body; and
    an inclination adjusting portion which is positioned between said inclination-adjusting bent plate portion of said inclination adjusting body and said housing so as to overlap said bending optical element as viewed along said post-bending optical axis, wherein said inclination adjusting portion swings said inclination adjusting body about said swing pivot portion to adjust an inclination of said inclination adjusting body.

2. The bending imaging apparatus according to claim 1, wherein said inclination adjusting body comprises:
    a biaser positioned between said inclination-adjusting bent plate portion of said inclination adjusting body and said housing to bias said mounting plate portion of said inclination adjusting body in a direction away from said housing; and a pair of adjustment screw members which fixedly engage said inclination-adjusting bent plate portion of said inclination adjusting body with said housing against a biasing force of said biaser.

3. The bending imaging apparatus according to claim 2, wherein said inclination-adjusting bent plate portion of said inclination adjusting body comprises:

a flat plate portion which bends toward said bending optical element from said mounting plate portion; and a pair of screw-engagement portions which extend toward said underside of said bending optical element from said flat plate portion, wherein said pair of adjustment screw members are screw-engaged with said pair of screw-engagement portions.

4. The bending imaging apparatus according to claim 3, wherein axes of said pair of adjustment screw members are positioned inside a planar outline of said image sensor with respect to a direction of said post-bending optical axis.

5. The bending imaging apparatus according to claim 1, wherein said swing pivot portion comprises:

a swing pivot protrusion which is formed on an inner side marginal portion of said mounting plate portion at a central position on said inner side marginal portion to protrude in a direction away from said bending optical element, said inner side marginal portion being positioned on an opposite side of said mounting plate portion from the inclination-adjusting bent plate portion side; and a contact portion which is formed on said housing and is in contact with said swing pivot protrusion.

* * * * *